United States Patent
Nishikawa

(10) Patent No.: US 11,496,901 B2
(45) Date of Patent: Nov. 8, 2022

(54) RADIO COMMUNICATION APPARATUS, WIRELESS LAN ROUTER, UNAUTHORIZED ACCESS PREVENTION METHOD, AND RADIO COMMUNICATION SYSTEM

(71) Applicant: NEC Platforms, Ltd., Kawasaki (JP)

(72) Inventor: Hiroshi Nishikawa, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/971,428

(22) PCT Filed: Feb. 27, 2018

(86) PCT No.: PCT/JP2018/007302
§ 371 (c)(1),
(2) Date: Aug. 20, 2020

(87) PCT Pub. No.: WO2019/167132
PCT Pub. Date: Sep. 6, 2019

(65) Prior Publication Data
US 2020/0389794 A1    Dec. 10, 2020

(51) Int. Cl.
*H04W 12/08*    (2021.01)
*H04W 48/16*    (2009.01)
(Continued)

(52) U.S. Cl.
CPC ......... *H04W 12/08* (2013.01); *H04W 12/122* (2021.01); *H04W 48/16* (2013.01); *H04W 84/12* (2013.01)

(58) Field of Classification Search
CPC ..... H04W 12/08; H04W 48/16; H04W 84/12; H04W 12/12; H04W 12/121
See application file for complete search history.

(56) References Cited

U.S. PATENT DOCUMENTS

2004/0172557 A1    9/2004    Nakae et al.
2014/0031078 A1    1/2014    Nishikawa
(Continued)

FOREIGN PATENT DOCUMENTS

JP       3794491 B2       7/2006
JP       2007-174287 A    7/2007
(Continued)

OTHER PUBLICATIONS

International Search Report for PCT Application No. PCT/JP2018/007302, dated May 22, 2018.
(Continued)

*Primary Examiner* — Wayne H Cai

(57) ABSTRACT

An object of the present invention is to provide a radio communication apparatus, a wireless LAN router, an unauthorized access prevention method, and a radio communication system that have security for protection against unauthorized access. A radio communication apparatus (1) according to the present invention includes: first radio communication means (10) for functioning as an access point for radio communication; second radio communication means (20) for functioning as an access point for radio communication; and storage means (21) for storing dummy information. The first radio communication means (10) has a security level higher than that of the second radio communication means (20), and the second radio communication means (20) is capable of transmitting the dummy information stored in the storage means (21).

9 Claims, 5 Drawing Sheets

(51) Int. Cl.
    *H04W 12/122*    (2021.01)
    *H04W 84/12*     (2009.01)

(56) References Cited

U.S. PATENT DOCUMENTS

2018/0034814 A1      2/2018   Tachikawa
2018/0249517 A1*     8/2018   Park .................. H04W 76/11
2018/0332471 A1*    11/2018   Zhu .................... H04L 63/061

FOREIGN PATENT DOCUMENTS

| JP | 2009-065538 A | 3/2009 |
| JP | 2012-222761 A | 11/2012 |
| JP | 2014-027538 A | 2/2014 |
| JP | 5708183 B2    | 4/2015 |
| WO | 2010/038726 A1 | 4/2010 |
| WO | 2016/136648 A1 | 9/2016 |

OTHER PUBLICATIONS

Japanese Office Action for JP Application No. 2020-503133 dated Aug. 17, 2021 with English Translation.
Japanese Office Communication for JP Application No. 2020-503133 dated Feb. 15, 2022 with English Translation.

\* cited by examiner

RADIO COMMUNICATION APPARATUS, WIRELESS LAN ROUTER, UNAUTHORIZED ACCESS PREVENTION METHOD, AND RADIO COMMUNICATION SYSTEM

This application is a National Stage Entry of PCT/JP2018/007302 filed on Feb. 27, 2018, the contents of all of which are incorporated herein by reference, in their entirety.

TECHNICAL FIELD

The present invention relates to a radio communication apparatus, a wireless LAN router, an unauthorized access prevention method, and a radio communication system.

BACKGROUND ART

Security technologies for preventing unauthorized access in radio communication such as a wireless Local Area Network (LAN) are known. For example, Patent Literature 1 discloses a configuration in which a firewall device transfers a packet to a decoy device based on a distribution condition. Patent Literature 2 discloses a configuration in which communication information of an authorized access point is concealed by providing a plurality of access points each of which repeatedly transmits false communication information destined for itself in addition to the authorized access point.

CITATION LIST

Patent Literature

Patent Literature 1: Japanese Patent No. 3794491
Patent Literature 2: Japanese Patent No. 5708183

SUMMARY OF INVENTION

Technical Problem

In recent years, as security technologies have improved, methods for obtaining unauthorized access have become more sophisticated. This leads to a problem that the security described above may be broken. Therefore, there is a demand to further enhance the security for protecting communication information from unauthorized access in a radio communication apparatus.

The present disclosure has been made in view of the aforementioned problem and an example object thereof is to provide a radio communication apparatus, a wireless LAN router, an unauthorized access prevention method, and a radio communication system that have security for protection against unauthorized access.

Solution to Problem

A radio communication apparatus according to an example aspect of the invention includes: first radio communication means for functioning as an access point for radio communication; second radio communication means for functioning as an access point for radio communication; and storage means for storing dummy information, in which the first radio communication means has a security level higher than that of the second radio communication means, and the second radio communication means is capable of transmitting the dummy information stored in the storage means.

A wireless LAN router according to an example aspect of the invention includes: first radio communication means for functioning as an access point for radio communication; second radio communication means for functioning as an access point for radio communication; and storage means for storing dummy information, in which the first radio communication means has a security level higher than that of the second radio communication means, and the second radio communication means includes a radio communication apparatus capable of transmitting the dummy information stored in the storage means.

An unauthorized access prevention method according to an example aspect of the invention is an unauthorized access prevention method for executing control for preventing unauthorized access to a first radio access point, the unauthorized access prevention method including: detecting a connection from an external terminal to a second radio access point that is set to a security level lower than that of the first radio access point; and transmitting dummy information to the external terminal when the connection from the external terminal to the second radio access point is detected.

A radio communication system according to an example aspect of the invention includes a first radio communication apparatus, and a second radio communication apparatus configured to prevent unauthorized access to the first radio communication apparatus, in which each of the first and the second radio communication apparatuses has a function as an access point for radio communication, the first radio communication apparatus has a higher security level than that of the second radio communication apparatus, and the second radio communication apparatus is capable of transmitting dummy information.

Advantageous Effects of Invention

According to the present disclosure, it is possible to provide a radio communication apparatus, a wireless LAN router, a radio communication method, and a radio communication system that have security for protection against unauthorized access.

DESCRIPTION OF EMBODIMENTS

Specific example embodiments will be described hereinafter in detail with reference to the drawings. The same or corresponding elements are denoted by the same symbols throughout the drawings, and repeated descriptions are omitted as necessary for the sake of clarity.

Each of the example embodiments described below can be used individually, or two or more of the example embodiments may be appropriately combined with one another.

These example embodiments include novel features different from one another. Accordingly, these example embodiments contribute to attaining objects or solving problems different from one another, and thus contribute to providing advantages different from one another.

First Example Embodiment

Figure 1:
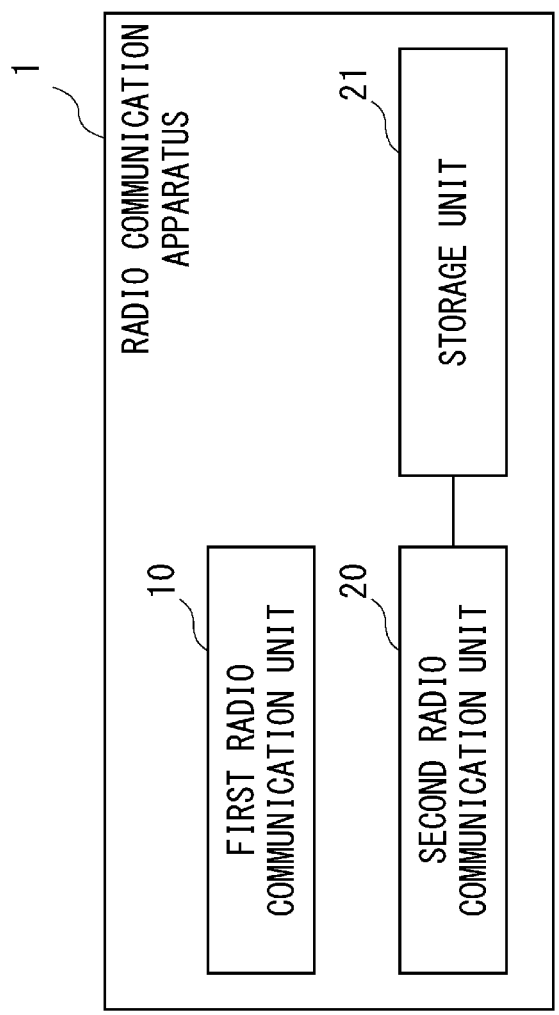
FIG. 1 is a block diagram showing a radio communication apparatus according to a first example embodiment.

First, a first example embodiment of the present invention is described with reference to FIG. 1. FIG. 1 is a block diagram showing a radio communication apparatus 1 according to the first example embodiment. As shown in FIG. 1, the radio communication apparatus 1 includes a first radio communication unit 10, a second radio communication unit 20, and a storage unit 21.

The first radio communication unit 10 is first radio communication means for functioning as an access point for radio communication. The second radio communication unit 20 is second radio communication means for functioning as an access point for radio communication. The first radio communication unit 10 has a higher security level than that of the second radio communication unit 20.

The storage unit 21 is storage means for storing dummy information. The second radio communication unit 20 is connected to the storage unit 21 and can transmit the dummy information stored in the storage unit 21. Note that the dummy information is data that is not confidential or informative and that may be acquired by a third party through unauthorized access.

Here, a description is given of a case in which an external terminal that is not allowed to access the radio communication apparatus 1 attempts unauthorized access to the radio communication apparatus 1.

First, the external terminal attempting unauthorized access attempts to connect to either of the first and the second radio communication units 10 and 20. At this time, as the first radio communication unit 10 has a higher security level than that of the second radio communication unit 20, the external terminal attempting unauthorized access cannot easily connect to the first radio communication unit 10. On the other hand, the external terminal attempting unauthorized access can relatively easily connect to the second radio communication unit 20 of which the security level is relatively lower than that of the first radio communication unit 10. Accordingly, in the above-described configuration, it is possible to guide the external terminal attempting unauthorized access to connect to the second radio communication unit 20. That is, it is possible to prevent unauthorized access to the first radio communication unit 10.

Further, as the second radio communication unit 20 can transmit dummy information stored in the storage unit 21, the external terminal connected to the second radio communication unit 20 can acquire the dummy information. However, as described above, the dummy information is data which may be acquired by a third party, so that the unauthorized access causes no damage.

As described above, the radio communication apparatus 1 has security for protecting communication information from unauthorized access.

Second Example Embodiment

Figure 2:
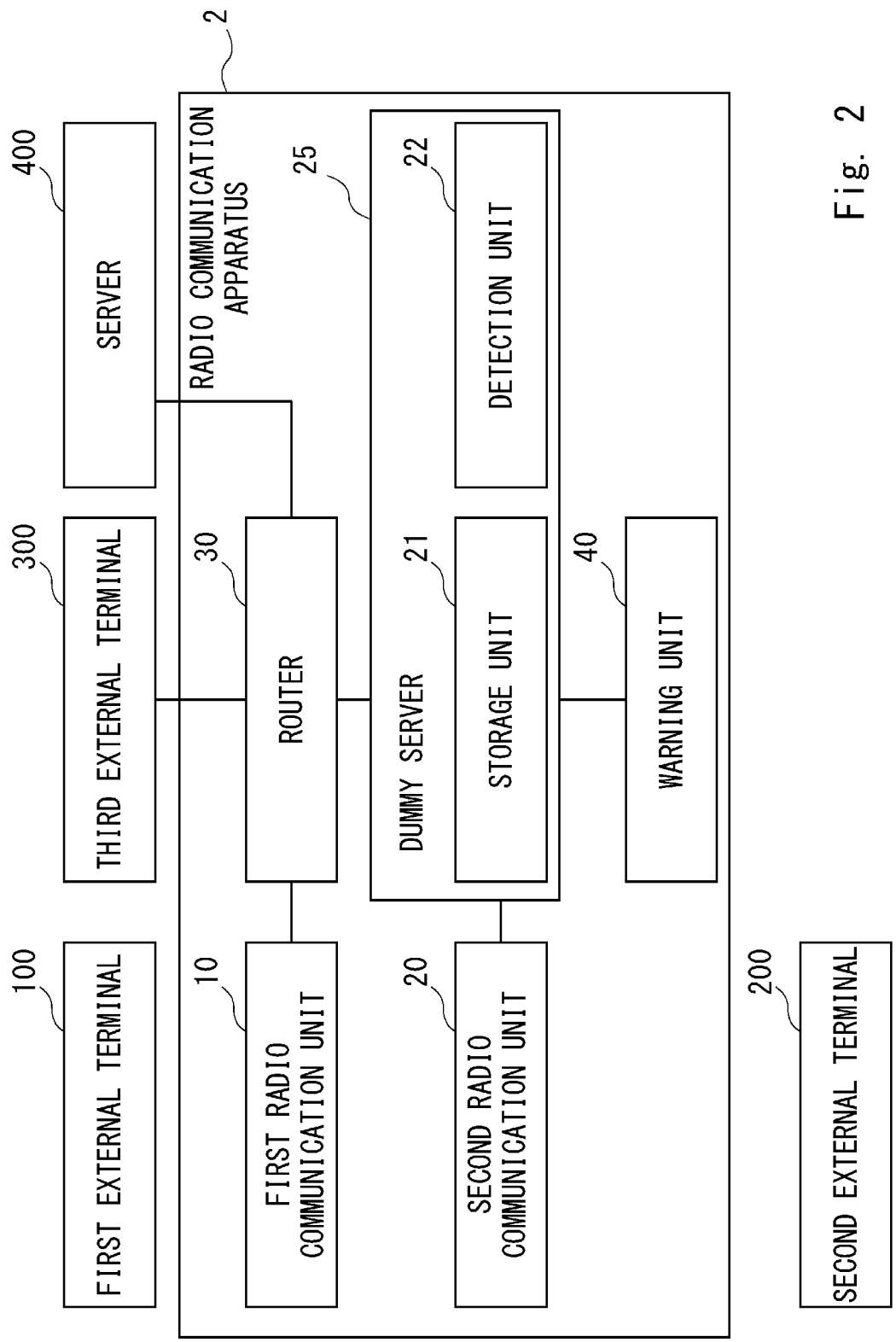
FIG. 2 is a block diagram showing a radio communication apparatus according to a second example embodiment.
Figure 3:
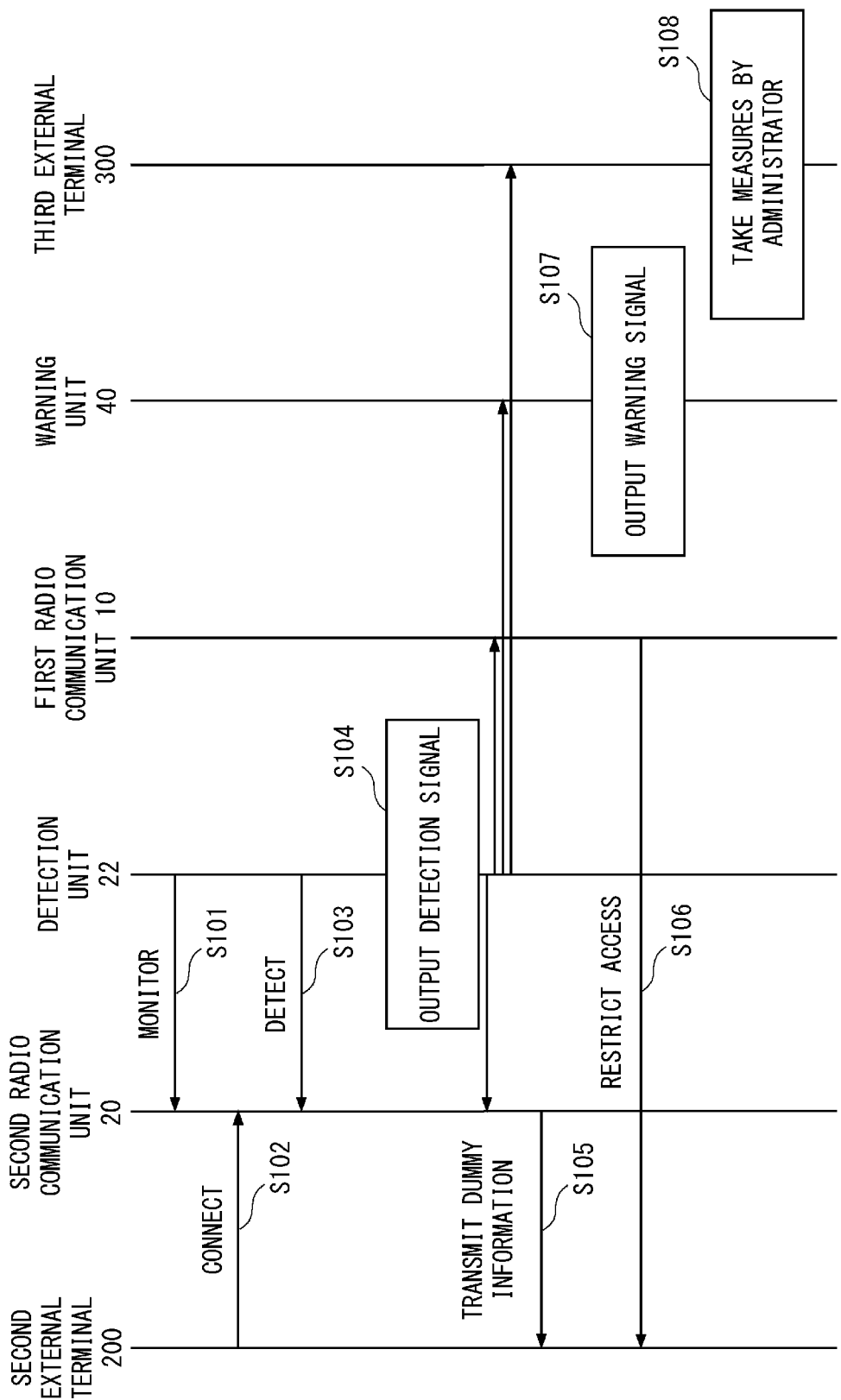
FIG. 3 is a sequence diagram showing an operation flow of the radio communication apparatus according to the second example embodiment.

Next, a second example embodiment of the present invention is described with reference to FIGS. 2 and 3. FIG. 2 is a block diagram showing a radio communication apparatus 2 according to this example embodiment. As shown in FIG. 2, the radio communication apparatus 2 includes the first radio communication unit 10, the second radio communication unit 20, a dummy server 25, a router 30, and a warning unit 40. The dummy server 25 includes the storage unit 21 and a detection unit 22. The radio communication apparatus 2 is, for example, a wireless LAN router.

A first external terminal 100 shown in FIG. 2 is an external terminal that is allowed to access the radio communication apparatus 2. A second external terminal 200 is an external terminal that is not allowed to access the radio communication apparatus 2. A third external terminal 300 is an external terminal used by an administrator of the radio communication apparatus 2. The third external terminal 300 is connected by a wire to the radio communication apparatus 2. The third external terminal 300 has authority to instruct the radio communication apparatus 2 to perform operations such as a shutdown.

Note that the first, the second, the third external terminals 100, 200, and 300 are communication terminals such as computers and smartphones. Further, the third external terminal 300 may be wirelessly connected to the radio communication apparatus 2.

Further, a server 400 stores information to be protected from unauthorized access. The server 400 is a storage device including, for example, a nonvolatile memory. The server 400 is connected by a wire to the radio communication apparatus 2. The first external terminal 100 can acquire information stored in the server 400 via the first radio communication unit 10.

Note that the server 400 may be wirelessly connected to the radio communication apparatus 2.

Each of the first and the second radio communication units 10 and 20 can be used as, for example, an access point of a wireless LAN conforming to the IEEE 802.11 standard. The first and the second radio communication units 10 and 20 include Service Set IDentifiers (SSIDs) different from each other. Note that the second radio communication unit 20 may include a plurality of SSIDs.

The first radio communication unit 10 has a higher security level than that of the second radio communication unit 20. For example, the first radio communication unit 10 can be configured to have the security standard of Wi-Fi Protected Access 2 (WPA2), and the second radio communication unit 20 can be configured to have the security standard of WPA or Wired Equivalent Privacy (WEP). The first radio communication unit 10 performs authentication using an SSID and a password and is connected to the first external terminal 100.

The dummy server 25 is a server including the storage unit 21 and the detection unit 22. The dummy server 25 is connected to the second radio communication unit 20, the router 30, and the warning unit 40. That is, the storage unit 21 and the detection unit 22 housed in the dummy server 25 are configured so that they can connect to the second radio communication unit 20, the router 30, and the warning unit 40.

The storage unit 21 is storage means for storing dummy information. Note that the dummy information refers to data that is not confidential or informative and that may be acquired by a third party through an unauthorized access attack. For example, the dummy information can be false information having a format similar to that of information to be protected in the server 400, such as random personal information or fictitious experimental data. The dummy information may be data stored in the storage unit 21 in advance or data acquired from the third external terminal 300 or other networks.

The detection unit 22 is detection means for detecting a connection from an external terminal to the second radio communication unit 20. The detection unit 22 outputs a detection signal when it detects the connection from the external terminal to the second radio communication unit 20.

The router 30 is a router that performs relaying among the first radio communication unit 10, the dummy server 25, the third external terminal 300, and the server 400. The router 30 may be further connected to an external communication apparatus or a network other than the third external terminal 300 and the server 400.

The warning unit 40 is warning means for outputting a warning signal when a detection signal is acquired. The warning signal is output to warning output means (not shown) included in the radio communication apparatus 2 or an external device (not shown) outside the radio communication apparatus 2. The above warning output means and external device output warnings in the form of, for example, light and sound.

Here, a description is given of a case in which the second external terminal 200 that is not allowed to access the radio communication apparatus 2 attempts unauthorized access to the radio communication apparatus 1.

First, the second external terminal 200 tries to connect to either of the first and the second radio communication units 10 and 20 in order to obtain information stored in the server 400. Specifically, the second external terminal 200 acquires the SSID of each of the first and the second radio communication units 10 and 20, selects one of the SSIDs, and attempts to perform the connection. At this time, as the first radio communication unit 10 has a higher security level than that of the second radio communication unit 20, the second external terminal 200 cannot easily connect to the first radio communication unit 10. On the other hand, the second external terminal 200 can relatively easily connect to the second radio communication unit 20 of which the security level is relatively lower than that of the first radio communication unit 10. Accordingly, in above-described configuration, it is possible to guide the second external terminal 200 to connect to the second radio communication unit 20. That is, it is possible to prevent unauthorized access to information stored in the server 400.

Further, when the second radio communication unit 20 has a plurality of SSIDs, the second external terminal 200 can acquire the plurality of SSIDs possessed by the second radio communication unit 20. That is, a plurality of connection destinations other than the first radio communication unit 10 can be presented to the second external terminal 200. Accordingly, it is possible to lower the probability that the second external terminal 200 selects the first radio communication unit 10 as a connection destination.

An example of processing for preventing unauthorized access performed by the radio communication apparatus 2 is described below with reference to FIG. 3. FIG. 3 is a sequence diagram showing an operation flow of the radio communication apparatus 2.

First, in Step S101, the detection unit 22 monitors an access log of the second radio communication unit 20 and determines whether an external terminal is connected to the second radio communication unit 20.

In Step S102, it is assumed that the second external terminal 200 is connected to the second radio communication unit 20. In this case, in Step S103, the detection unit 22 detects that the second external terminal 200 is connected to the second radio communication unit 20. Then, in Step S104, the detection unit 22 outputs detection signals to the first and the second radio communication units 10 and 20, the warning unit 40, and the third external terminal 300.

After that, in Step S105, when the second radio communication unit 20 acquires the detection signal, it transmits dummy information to the second external terminal 200. At this time, the second external terminal 200 acquires the dummy information from the second radio communication unit 20. As it is difficult for the second external terminal 200 to instantaneously determine whether the dummy information is false information, it is possible to let the second external terminal 200 continue to connect to the second radio communication unit 20. That is, it is possible to prevent the second external terminal 200 from switching the connection destination to the first radio communication unit 10. Accordingly, an administrator of the radio communication apparatus 2 can take security measures against the unauthorized access from the second external terminal 200 by using the period until the second external terminal 200 notices that the dummy information is false information.

Further, in Step S106, the first radio communication unit 10 restricts a connection from the second external terminal 200, which is connected to the second radio communication unit 20, to the first radio communication unit 10. Specifically, the first radio communication unit 10 prohibits connections from all the external terminals other than the first external terminal 100 and the third external terminal 300. By doing so, it is possible to prevent unauthorized access from the second external terminal 200 to the information stored in the server 400.

Further, in Step S107, the warning unit 40 outputs a warning signal when it acquires the detection signal. In response to the warning signal, the radio communication apparatus 2 or an external device (not shown) outputs a warning in such a manner that it can be recognized by a user. By such a configuration, a user of the radio communication apparatus 2 can learn that there has been a connection from the external terminal to the second radio communication unit 20.

Further, after Step S104, an administrator of the radio communication apparatus 2 can recognize that there has been a connection from the external terminal to the second radio communication unit 20 by the detection signal acquired by the third external terminal 300. Accordingly, in Step S108, an administrator of the radio communication apparatus 2 can take security measures such as a shutdown of the radio communication apparatus 2.

Note that Steps S105 to S108 may be performed in any order or may be performed simultaneously.

Further, in Step S106, the first radio communication unit 10 may prohibit connections from all the external terminals other than the third external terminal 300. That is, the first radio communication unit 10 may prohibit the connection from the first external terminal 100. By doing so, it is possible to prevent an unauthorized user from making unauthorized access by using the first external terminal 100 for an evil purpose.

Third Example Embodiment

Next, a third example embodiment of the present invention is described.

The configuration of the radio communication apparatus in this example embodiment is the same as that in the second example embodiment (see FIG. 2). However, this example embodiment differs from the second embodiment in that the detection unit 22 according to this example embodiment has a function of detecting identification information of an external terminal connected to the second radio communication unit 20. The identification information is information such as a Media Access Control (MAC) address and an Internet Protocol (IP) address by which communication terminals can be identified.

Figure 4:
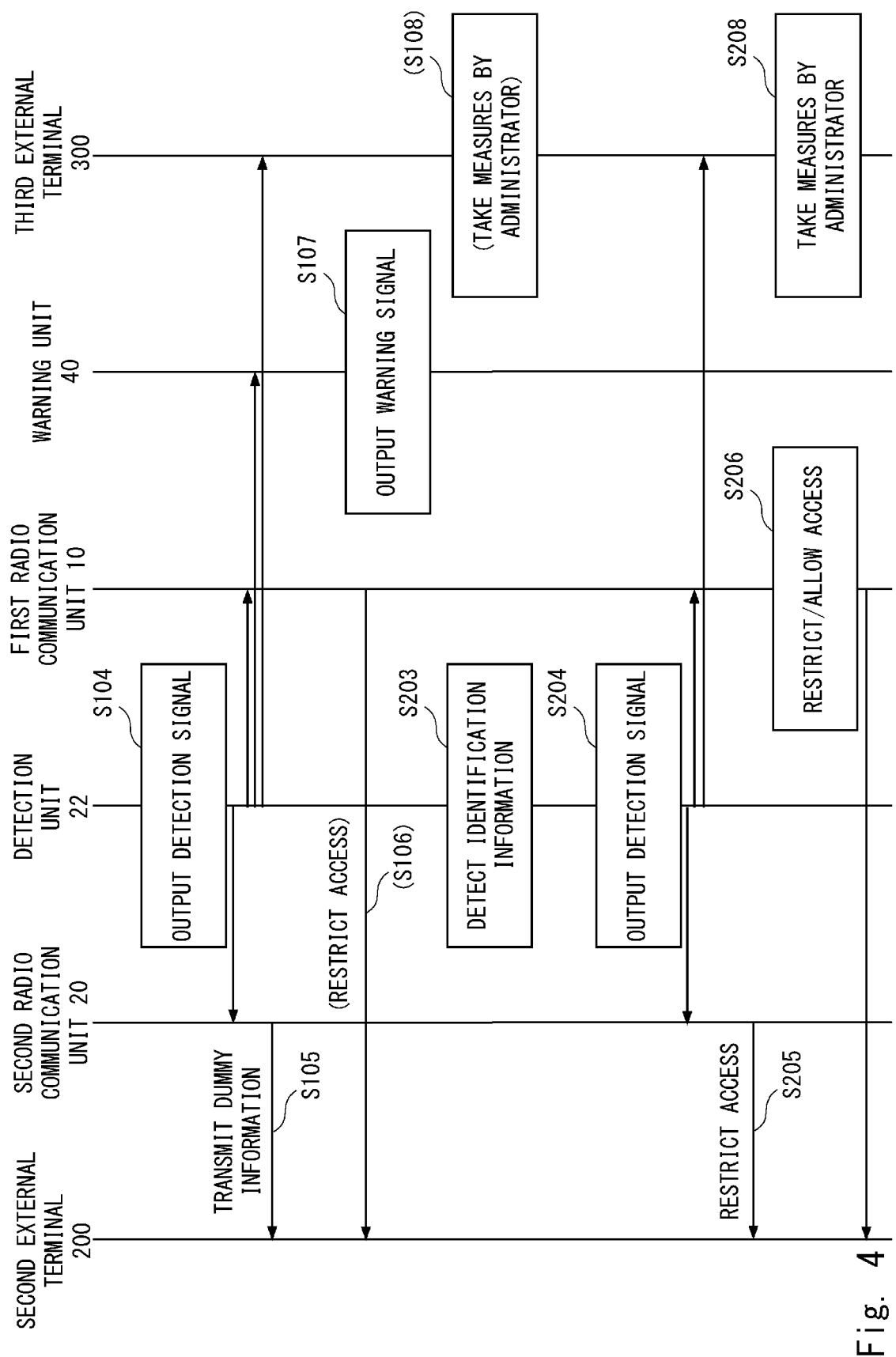
FIG. 4 is a sequence diagram showing an operation flow of a radio communication apparatus according to a third example embodiment.

An example of processing for preventing unauthorized access performed by the radio communication apparatus according to this example embodiment is described below with reference to FIG. 4. FIG. 4 is a sequence diagram showing an operation flow of the radio communication apparatus according to this example embodiment.

As shown in FIG. 4, the operation flow of the radio communication apparatus according to this example embodiment includes Steps S203 to S208 after Step S104. Note that in FIG. 4, Steps S101 to S103 are omitted.

In Step S203 after Step S104, the detection unit 22 according to this example embodiment analyzes the access log of the second radio communication unit 20 and detects identification information of the second external terminal 200 connected to the second radio communication unit 20.

Then, in Step S204, the detection unit 22 outputs a detection signal including the identification information of the second external terminal 200 to the first and the second radio communication units 10 and 20 and the third external terminal 300.

After that, in Step S205, the second radio communication unit 20 restricts a connection from the external terminal having the identification information included in the acquired detection signal to the second radio communication unit 20. For example, the second radio communication unit 20 prohibits a connection from the external terminal corresponding to the acquired identification information. By doing so, it is possible to prevent damage from an unauthorized access attack to the second radio communication unit 20.

Further, in Step S206, the first radio communication unit 10 restricts a connection from the external terminal having the identification information included in the acquired detection signal to the first radio communication unit 10. For example, the first radio communication unit 10 prohibits a connection from the external terminal corresponding to the acquired identification information. By doing so, it is possible to prevent unauthorized access from the second external terminal 200 to the first radio communication unit 10.

Note that in Step S206, when the first radio communication unit 10 determines that the identification information included in the acquired detection signal is identification information of the terminal of an authorized user, the first radio communication unit 10 may allow the terminal of the authorized user to connect to the first radio communication unit 10. For example, the first radio communication unit 10 may determine whether the acquired identification information is identification information of the terminal of an authorized user by checking it against a predetermined authorization list. In this case, it is possible to prevent a connection from an authorized user to the first radio communication unit 10 from being wrongly restricted.

Further, after Step S204, an administrator of the radio communication apparatus 2 can recognize the identification information of the terminal connected to the second radio communication unit 20 by the detection signal acquired by the third external terminal 300. Accordingly, in Step S208, the administrator of the radio communication apparatus 2 can take measures such as reporting of the second external terminal 200 based on the identification information.

Note that in this example embodiment, Steps S106 and S108 may be omitted.

Further, Steps S205 to S208 may be performed in any order or may be performed simultaneously.

Fourth Example Embodiment

Figure 5:
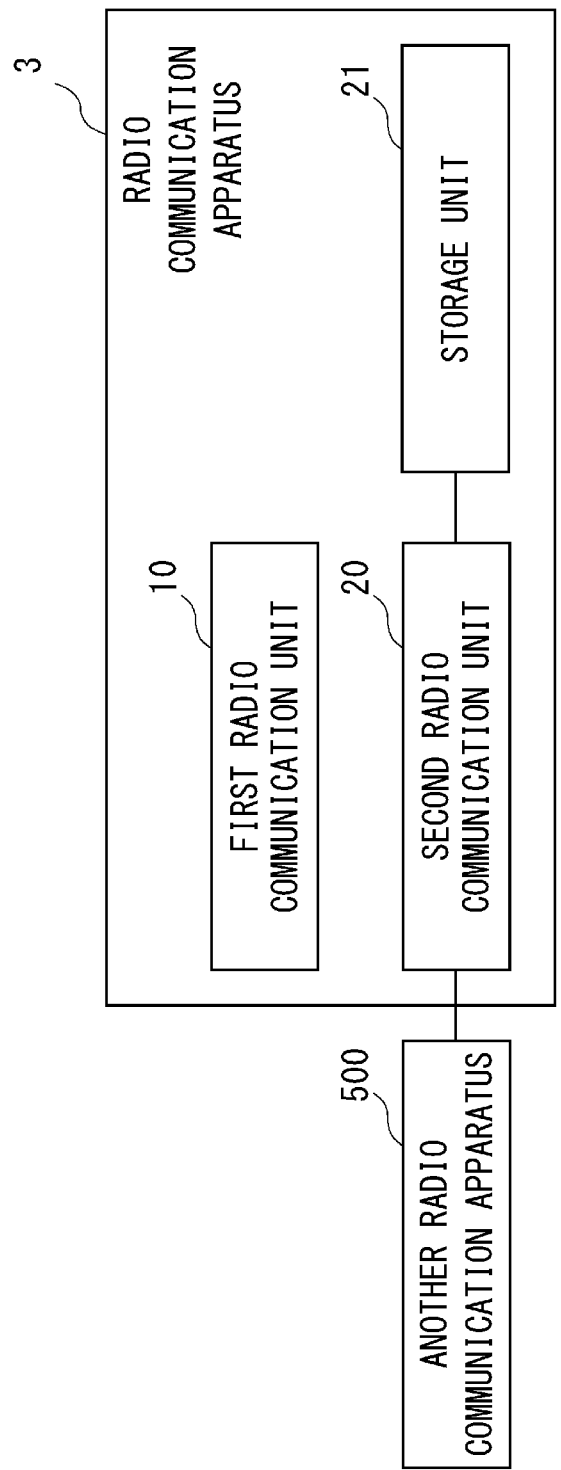
FIG. 5 is a block diagram showing a radio communication apparatus according to a fourth example embodiment.

Next, a fourth example embodiment of the present invention is described with reference to FIG. 5. FIG. 5 is a block diagram showing a radio communication apparatus 3 according to the fourth example embodiment. As shown in FIG. 5, the radio communication apparatus 3 includes the first radio communication unit 10, the second radio communication unit 20, and the storage unit 21.

Further, another radio communication apparatus 500 shown in FIG. 5 is a radio communication apparatus different from the radio communication apparatus 3. The other radio communication apparatus 500 may be, for example, an access point of a wireless LAN or a communication terminal such as a computer or a smartphone. Further, the other radio communication apparatus 500 may be connected to an external terminal (not shown) used by an administrator of the radio communication apparatus 3.

In this example embodiment, the second radio communication unit 20 is connected to the other predetermined radio communication apparatus 500. Further, the second radio communication unit 20 repeatedly performs radio communication with the other predetermined radio communication apparatus 500.

In the above-described configuration, as the second radio communication unit 20 actively performs radio communication, it is possible to give the impression that the second radio communication unit 20 is an important access point to an unauthorized user who tries to obtain unauthorized access. Accordingly, it is possible to facilitate guiding an unauthorized user to make unauthorized access to the second radio communication unit 20.

Note that the present invention is not limited to the aforementioned example embodiments and various modifications can be made without departing from the spirit of the present invention.

For example, the first and the second radio communication units 10 and 20 may be stored in housings different from each other. In such a configuration, it is possible to separately manage the housing including the first radio communication unit 10 and the housing including the second radio communication unit 20.

REFERENCE SIGNS LIST 1-3 RADIO COMMUNICATION APPARATUS
10 FIRST RADIO COMMUNICATION UNIT
20 SECOND RADIO COMMUNICATION UNIT
21 STORAGE UNIT
22 DETECTION UNIT
25 DUMMY SERVER
30 ROUTER
40 WARNING UNIT
100 FIRST EXTERNAL TERMINAL
200 SECOND EXTERNAL TERMINAL
300 THIRD EXTERNAL TERMINAL
400 SERVER
500 ANOTHER RADIO COMMUNICATION APPARATUS

What is claimed is:
1. A radio communication apparatus comprising:
a first radio communicator configured to function as a first access point for radio communication;

a second radio communicator configured to function as a second access point for radio communication;

a detector configured to output a detection signal to at least the first radio communicator and the second radio communicator upon detecting a second connection from an external terminal to the second radio communicator; and a storage configured to store dummy information, wherein the first radio communicator has a first security standard that has a higher security level than a second security standard of the second radio communicator, upon acquiring the detection signal, the second radio communicator transmits the dummy information to the external terminal, and upon acquiring the detection signal, the first radio communicator prevents a first connection to the first radio communicator from the external terminal that is connected to the second radio communicator.

2. The radio communication apparatus according to claim 1, wherein the detector acquires identification information of the external terminal connected to the second radio communicator.

3. The radio communication apparatus according to claim 2, wherein the detection signal includes the identification information of the external terminal connected to the second radio communicator.

4. The radio communication apparatus according to claim 1, wherein the radio communication apparatus is configured to output a warning signal when the detection signal is acquired.

5. The radio communication apparatus according to claim 1, wherein the second radio communicator has a plurality of Service Set IDentifiers (SSIDs).

6. The radio communication apparatus according to claim 1, wherein the second radio communicator repeatedly performs radio communication with another predetermined radio communication apparatus.

7. A wireless LAN router comprising the radio communication apparatus according to claim 1.

8. An unauthorized access prevention method for executing control for preventing unauthorized access to a first radio access point, the unauthorized access prevention method comprising:

detecting a second connection from an external terminal to a second radio access point that has a second security standard that has a lower security level than a first security standard of the first radio access point;

transmitting dummy information to the external terminal when the second connection from the external terminal to the second radio access point is detected; and prevents a first connection to the first radio access point from the external terminal that is connected to the second radio access point upon the detecting the connection.

9. A radio communication system comprising a first radio communicator, a second radio communicator, and a detection apparatus configured to prevent unauthorized access to the first radio communicator, wherein each of the first and the second radio communicators is configured to function as an access point for radio communication, the first radio communicator has a first security standard that has a higher security level than a second security standard of the second radio communicator, the detection apparatus is configured to output a detection signal upon detecting a second connection from the external terminal to the second radio communicator, upon acquiring the detection signal, the second radio communicator transmits the dummy information to the external terminal, and upon acquiring the detection signal, the first radio communicator prevents a first connection to the first radio communicator from the external terminal that is connected to the second radio communicator.

\* \* \* \* \*